(12) United States Patent
Kim et al.

(10) Patent No.: US 8,687,076 B2
(45) Date of Patent: Apr. 1, 2014

(54) MOVING IMAGE PHOTOGRAPHING METHOD AND MOVING IMAGE PHOTOGRAPHING APPARATUS

(75) Inventors: Eun-young Kim, Suwon-si (KR); Seung-a Yi, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 13/239,859

(22) Filed: Sep. 22, 2011

(65) Prior Publication Data

US 2012/0162470 A1    Jun. 28, 2012

(30) Foreign Application Priority Data

Dec. 23, 2010   (KR) ........................ 10-2010-0133717

(51) Int. Cl.
| | |
|---|---|
| H04N 5/225 | (2006.01) |
| H04N 7/14 | (2006.01) |
| G10L 15/00 | (2013.01) |
| G06K 9/00 | (2006.01) |

(52) U.S. Cl.
USPC ................ 348/220.1; 348/14.08; 348/211.12; 348/169; 704/246; 382/118

(58) Field of Classification Search
USPC ................... 348/222.1, 220.1, 14.08, 208.14, 348/208.16, 208.99, 208.12, 208.13, 169, 348/14.1, 14.07, 211.12, 240.99, 240.1, 348/14.01; 382/103, 118, 116, 181, 203, 382/209, 218, 255, 298, 299; 704/246, 247, 704/248, 214, 250, 260, 262, 502
See application file for complete search history.

(56) References Cited

U.S. PATENT DOCUMENTS

| | | | |
|---|---|---|---|
| 6,014,625 A * | 1/2000 | Lee .............................. 704/270 |
| 7,598,975 B2 * | 10/2009 | Cutler ....................... 348/14.08 |
| 2001/0042114 A1 | 11/2001 | Agraharam et al. |
| 2003/0048930 A1 * | 3/2003 | Mihara et al. ................. 382/118 |
| 2004/0267521 A1 * | 12/2004 | Cutler et al. .................. 704/202 |
| 2007/0110397 A1 * | 5/2007 | Tanikawa et al. .............. 386/95 |
| 2008/0313722 A1 * | 12/2008 | Cho et al. ......................... 726/7 |
| 2009/0201313 A1 * | 8/2009 | Thorn .......................... 345/620 |
| 2009/0220065 A1 | 9/2009 | Ahuja et al. |
| 2011/0075990 A1 * | 3/2011 | Eyer ............................. 386/241 |
| 2011/0085778 A1 * | 4/2011 | Iwase et al. ................... 386/228 |
| 2011/0131144 A1 * | 6/2011 | Ashour et al. ................ 705/319 |
| 2012/0263430 A1 * | 10/2012 | Spitzer-Williams .......... 386/224 |

FOREIGN PATENT DOCUMENTS

| | | |
|---|---|---|
| GB | 2 342 802 A | 4/2000 |
| JP | 2000-101901 A | 4/2000 |
| JP | 2004-118314 A | 4/2004 |

(Continued)

OTHER PUBLICATIONS

Search Report established for GB 1121694.2 (Apr. 11, 2012).

*Primary Examiner* — Tuan Ho
*Assistant Examiner* — Marly Camargo
(74) *Attorney, Agent, or Firm* — Drinker Biddle & Reath LLP

(57) ABSTRACT

A moving image photographing apparatus that recognizes the shape of a speaker's mouth, and/or recognizes the speaker's voice to detect a speaker area, and selectively performs image signal processing with respect to the detected speaker area, and a moving image photographing method using the moving image photographing apparatus. The moving image photographing apparatus may selectively reproduce a moving image by generating a still image including the speaker area and using the still image as a bookmark.

21 Claims, 6 Drawing Sheets

(56) References Cited

FOREIGN PATENT DOCUMENTS

| | | |
|---|---|---|
| JP | 2006-129480 A | 5/2006 |
| JP | 2008-085497 A | 4/2008 |
| KR | 1020040060374 A | 7/2004 |
| KR | 1020070010673 A | 1/2007 |
| KR | 1020100056859 A | 5/2010 |
| KR | 1020100065811 A | 6/2010 |

* cited by examiner

MOVING IMAGE PHOTOGRAPHING METHOD AND MOVING IMAGE PHOTOGRAPHING APPARATUS

CROSS-REFERENCE TO RELATED PATENT APPLICATION

This application claims the priority benefit of Korean Patent Application No. 10-2010-0133717, filed on Dec. 23, 2010, in the Korean Intellectual Property Office, the entirety of which is incorporated herein by reference.

BACKGROUND

1. Field of the Invention

The invention relates to a moving image photographing method and a moving image photographing apparatus.

2. Description of the Related Art

When a moving image is captured, images on a screen generally move according to movement of a sound source. For example, if a moving image is photographed with respect to a speaker, a user has to manually manipulate a photographing apparatus to capture an image of the speaker.

Also, when a user desires to selectively reproduce a moving image in which a specific subject is speaking, the user has to reproduce the moving image from the beginning or from an arbitrary point in the moving image to search for the portion of the moving image in which the specific subject is speaking.

SUMMARY

The invention provides a moving image photographing method that is used when a user selectively reproduces a moving image according to a speaker by recognizing and detecting a speaker area, selectively performing an image signal processing with respect to the speaker area, generating a still image including the speaker area, and using the generated still image as a bookmark, and a moving image photographing apparatus.

According to an aspect of the invention, there is provided a moving image photographing method including inputting a moving image photographed using a speaker as a subject; recognizing the shape of the speaker's mouth; and generating a still image comprising a speaker area when the shape of the speaker's mouth is changed.

The method may include identifying the speaker area using a face recognition algorithm, wherein the shape of the speaker's mouth is recognized with respect to the speaker area.

The method may include inputting data representing a speaker's voice; recognizing the speaker's voice; and when the speaker's voice is recognized, performing image signal processing with respect to the speaker area associated with the speaker's voice.

The method may recognize the speaker's voice by comparing stored voice data with the speaker's voice data; and when the speaker's voice data corresponds to the stored voice data, determining that the speaker's voice is recognized.

The method may perform image signal processing with respect to the speaker area by performing auto out-of-focusing with respect to the speaker area, wherein the still image comprises the speaker area in which the auto out-of-focusing is performed.

The method may perform image signal processing with respect to the speaker area by performing macro zooming with respect to the speaker area, wherein the still image comprises the speaker area in which the macro zooming is performed.

The method may perform image signal processing with respect to the speaker area by performing macro focusing with respect to the speaker area, wherein the still image comprises the speaker area in which the macro focusing is performed.

The method may include generating still images each comprising a speaker area when the speaker area is changed.

The method may include generating a moving image file comprising the still images functioning as bookmarks for the moving image.

According to another aspect of the invention, there is provided a moving image photographing apparatus including a moving image input unit for inputting a moving image photographed using a speaker as a subject; a mouth shape recognizing unit for recognizing the shape of the speaker's mouth; and a still image generating unit for generating a still image comprising a speaker area when the shape of the speaker's mouth is changed.

The moving image photographing apparatus may include a face recognizing unit for identifying the speaker area using a face recognition algorithm, wherein the mouth shape recognizing unit recognizes the shape of the speaker's mouth with respect to the speaker area.

The moving image photographing apparatus may include a voice input unit for inputting the speaker's voice; a voice recognizing unit for recognizing the speaker's voice; and an image signal processing unit for performing image signal processing with respect to the speaker area when the speaker's voice is recognized.

The voice recognizing unit may include a comparing unit for comparing stored voice data with data representing the speaker's voice; and a determining unit for determining that the speaker's voice is recognized when the speaker's voice data corresponds to the stored voice data.

The image signal processing unit may perform auto out-of-focusing with respect to the speaker area, and the still image generating unit may generate a still image comprising the speaker area in which the auto out-of-focusing is performed.

The image signal processing unit may perform macro zooming with respect to the speaker area, and the still image generating unit may generate a still image comprising the speaker area in which the macro zooming is performed.

The image signal processing unit may perform macro focusing with respect to the speaker area, and the still image generating unit may generate a still image comprising the speaker area in which the macro focusing is performed.

The still image generating unit may generate still images each comprising a speaker area when the speaker area is changed.

The moving image photographing may include a moving image file generating unit for generating a moving image file comprising the still images functioning as bookmarks for the moving image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

An exemplary embodiment according to the invention will be described in detail with reference to the accompanying drawings. In the following embodiments, a digital camera is used as a moving image photographing apparatus. However, the invention is not limited thereto, and the moving image photographing apparatus may be used in a personal digital assistant (PDA), a smart phone, etc.

Figure 1:
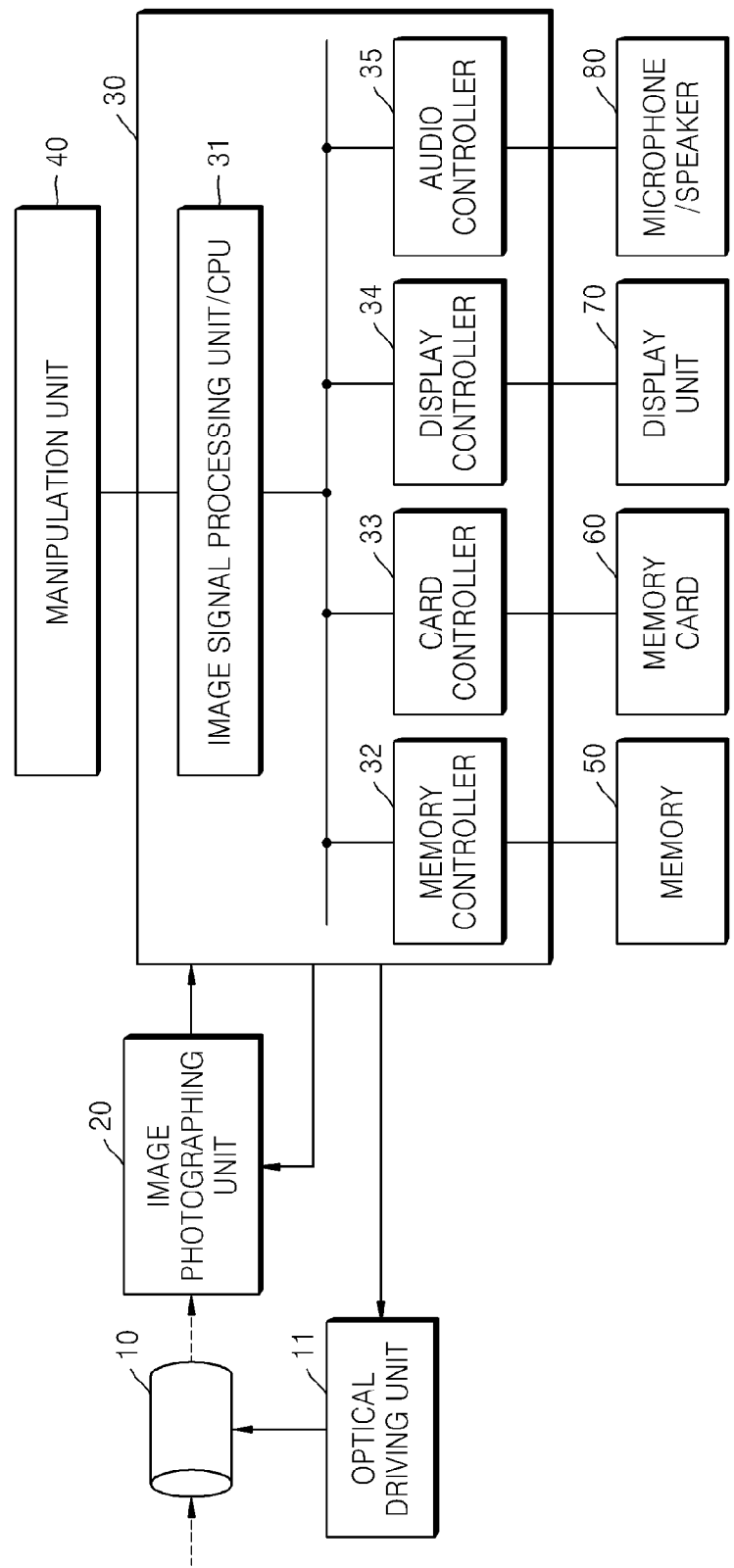
FIG. 1 is a block diagram illustrating a digital camera, according to an embodiment of the invention.

FIG. 1 is a block diagram for explaining a digital camera, according to an embodiment of the invention.

Referring to FIG. 1, the digital camera includes an optical unit 10, an optical driving unit 11 for driving the optical unit 10, an image photographing unit 20, a camera controlling unit 30, a manipulation unit 40, a memory 50, a memory card 60, a display unit 70, and a microphone/speaker 80.

The optical unit 10 includes an image forming optical unit for collecting optical signals applied from a subject, a shutter, and an aperture. The image forming lens unit includes a focus lens for adjusting a focus and a zoom lens for adjusting a focus distance.

The optical driving unit 11 may include a focus lens driving unit for adjusting a position of the focus lens, an aperture driving unit for adjusting an amount of light, and a shutter driving unit for adjusting opening/closing of the shutter.

The image photographing unit 20 includes an image capture device for capturing image of light having passing through an image forming optical unit of an interchangeable lens and generating an image signal. The image capture device may include a plurality of photoelectric converting units, which are arranged in a matrix array, a vertical or/and horizontal transmission path for moving charges from the photoelectric converting unit in synchronization with a timing signal to derive an image signal. The image capture device may be a charge coupled device (CCD) sensor, a complementary metal oxide semiconductor (CMOS), or the like. When the CCD sensor is used, the image photographing unit 20 may further include a correlated double sampling (CDS)/amplifier (AMP) for removing low frequency noise included in an electrical signal that is output from the image capture device and amplify the electrical signal up to an arbitrary level, and an analog/digital (A/D) converter for converting the electrical signal that is output from the CDS/AMP into a digital signal.

In the invention, a moving image input unit may include the optical unit 10 and the image photographing unit 20. When necessary, the moving image input unit may further include the optical driving unit 11.

Also, the digital camera includes the camera controlling unit 30. The camera controlling unit 30 includes an image signal processing unit/CPU 31.

The image signal processing unit/CPU 31 may calculate an auto white balance (AWB) evaluation value for adjusting white balance with respect to an image signal obtained from the image photographing unit 20, an auto exposure (AE) evaluation value for adjusting exposure, and an auto focusing (AF) evaluation value for adjusting focusing and may control optimum white balance control, exposure control, and auto focusing control according to the calculated evaluation value. Also, the image signal processing unit/CPU 31 may perform various application operations such as face recognition or scene recognition. The image signal processing unit/CPU 31 may also perform image processing for storing records and for displaying an image. The image processing may include gamma correction, color filter array interpolation, color matrix, color correction, color enhancement, etc. Also, the image signal processing unit/CPU 31 may compress a file in a joint photographic experts group (JPEG) compression format or a Lempel Ziv Welch (LZW) compression format in order to store the file.

Also, according to the invention, the image signal processing unit/CPU 31 may selectively include image signal processing operations for recognizing the shape of a speaker's mouth and/or input voice data, capturing an image of the recognized speaker, generating the image of the recognized speaker as a still image, and generating a stored moving image file using the still image as a bookmark, which will be described in detail below.

In addition, the camera controlling unit 30 includes a memory controller 32, a card controller 33, a display controller 34, and an audio controller 35.

The memory controller 32 may temporarily store a captured image, various pieces of information, etc., in the memory 50 or output the captured image, the various pieces of information from the memory 50. The memory controller 32 may also read program information stored in the memory 50. The memory 50, which is a buffer memory for temporarily storing a captured image, various pieces of information, etc., may include a dynamic random access memory (DRAM), a synchronous DRAM (SDRAM), etc. The memory 50, which is a storage unit for storing a program, may be a flash memory, a read only memory (ROM), etc.

The card controller 33 may store an image file in the memory card 60 and read the image file from the memory card 60. The card controller 33 may control reading and storing of not only an image file but also various pieces of information to be stored. The memory card 60 may be a secure digital (SD) card. In the current embodiment, the memory card 60 is used as a recording medium, but the invention is not limited thereto. Thus, an image file and various pieces of information may be stored using a recording medium such as an optical disc, e.g., a compact disc (CD), a digital versatile disc (DVD), or a blue-ray disc, an optical magnetic disk, a magnetic disk, or the like. When a recording medium such as an optical disc, e.g., a CD, a DVD, or a blue-ray disc, an optical magnetic disk, a magnetic disk, or the like is used, the digital camera may further include a reader for reading the recording medium.

Also, the display controller 34 may control image displaying of the display unit 70. The display unit 70 may be a liquid crystal display (LCD) or an organic light-emitting display.

In addition, the image signal processing unit/CPU 31 may include an audio controller 35. The audio controller 35 may convert an analog audio signal, for example, a speaker's voice, input from the microphone/speaker 80 into a digital signal and may input the digital signal in the image signal processing unit/CPU 31. The audio controller 35 may also convert a digital signal applied from the image signal processing unit/CPU 31 into an analog signal and may output the analog signal to the outside through the microphone/speaker 80. In the invention, the microphone/speaker 80 or the audio controller 35 may operate as a voice input unit.

Also, the digital camera includes the manipulation unit 40 for inputting a user's manipulation unit signal. The manipulation unit 40 may manipulate the digital camera by a user or perform various setting operations. For example, the manipulation unit 40 may be a button, a key, a touch panel, a touch screen, a dial, or the like. The manipulation unit 40 may input a user's manipulation signal for turning on/off a power source, starting/stopping image photographing, starting/stopping/searching image reproducing, driving an optical system, converting a mode (e.g., to perform a moving image photographing mode), manipulating a menu, and manipulating options. For example, a shutter button may be half-pressed, full-pressed, and released by a user. When the shutter button is half-pressed (S1 manipulation), a manipulation signal for starting focus control is output, and when the half-pressing of the shutter button is released, the focus control is finished. When the shutter button is full-pressed (S2 manipulation), a manipulation signal for starting image photographing may be output. The manipulation signal may be sent to the image signal processing unit/CPU 31 so as to drive a corresponding component.

Figure 2:
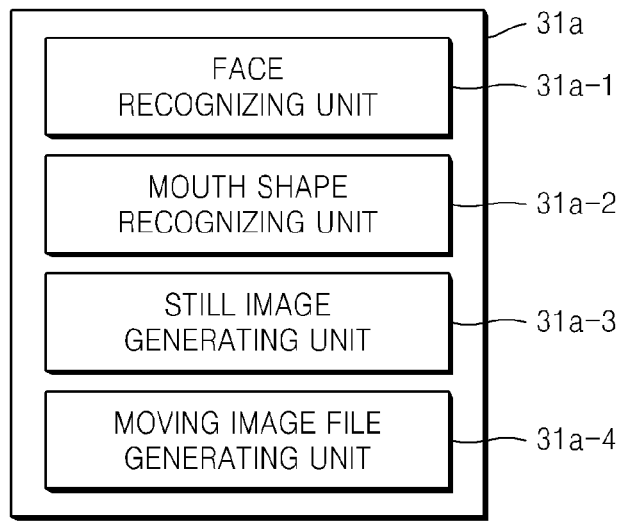
FIG. 2 is a block diagram illustrating an image signal processing unit/central processing unit (CPU) of the digital camera of FIG. 1, according to an embodiment of the invention.

FIG. 2 is a block diagram for explaining an image signal processing unit/CPU 31a of the digital camera of FIG. 1, according to an embodiment of the invention.

Referring to FIGS. 1 and 2, the image signal processing unit/CPU 31a includes a mouth shape recognizing unit 31a-2 and a still image generating unit 31a-3.

The mouth shape recognizing unit 31a-2 recognizes the shape of a speaker's mouth with respect to frame images of a moving image that is input through the moving image input unit of the optical unit 10 and the image photographing unit 20. The shape of a speaker's mouth may be recognized using various pieces of information such as color information, edge information, or vector information of the frame images. The still image generating unit 31a-3 may generate a still image by capturing an image including a speaker area in the frame image when the recognized shape of the speaker's mouth is changed.

Also, the image signal processing unit/CPU 31a may further include a face recognizing unit 31a-1. The face recognizing unit 31a-1 may specify a speaker area through a face recognition algorithm with respect to the frame images constituting the moving image. The mouth shape recognizing unit 31a-2 may recognize the shape of a speaker's mouth with respect to the speaker area. When a plurality of the speaker areas in which the shape of the speaker's mouth is changed are detected, in detail, detected in chronological order, the still image generating unit 31a-3 may generate still images respectively including the speaker areas. The plurality of speaker areas each may function as a bookmark. Afterwards, when the moving image is reproduced, if a still image including a speaker area that functions as a bookmark is selected, the digital camera reproduce from a scene where a speaker included in the corresponding still image speaks. Accordingly, the moving image for each speaker may be selectively reproduced. The image signal processing unit/CPU 31a may further include a moving image file generating unit 31a-4 for generating a moving image file including the plurality of still images functions as a bookmark and the moving image. The moving image file may be generated by compressing the moving image and/or the still images using an H.264 codec.

Figure 3:
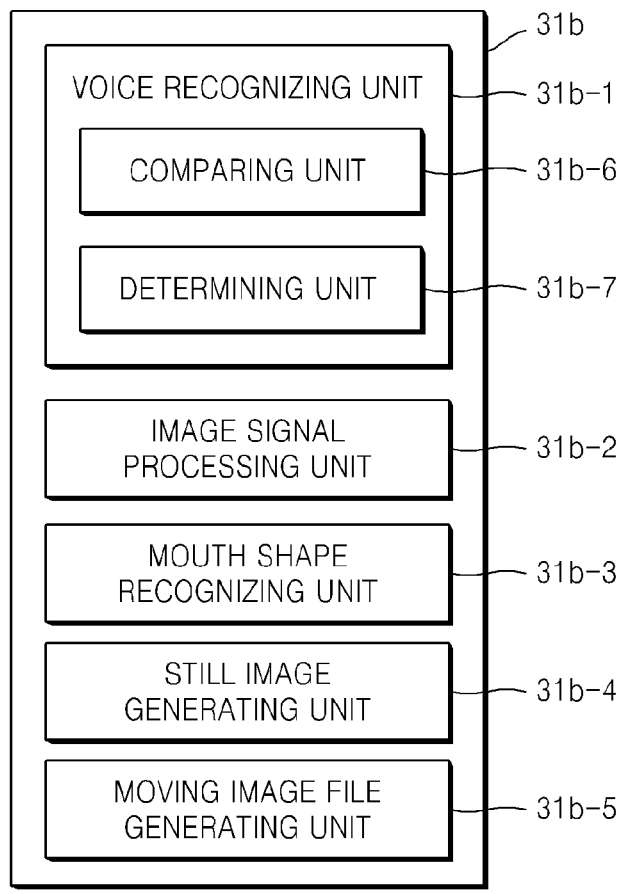
FIG. 3 is a block diagram illustrating an image signal processing unit/CPU of the digital camera of FIG. 1, according to another embodiment of the invention.

FIG. 3 is a block diagram for explaining an image signal processing unit/CPU 31b of the digital camera of FIG. 1, according to another embodiment of the invention.

Referring to FIG. 3, the image signal processing unit/CPU 31b includes a voice recognizing unit 31b-1 for recognizing speaker's voice that is input through the microphone/speaker 80 that is a voice input unit. The voice recognizing unit 31b-1 includes a comparing unit for comparing stored voice data and the speaker's voice data, and a determining unit for determining to recognize the speaker's voice when the stored voice data corresponds to the speaker's voice data.

When the voice recognizing unit 31b-1 recognizes the speaker's voice, the image signal processing unit/CPU 31b includes an image signal processing unit 31b-2 for performing image signal processing that is previously set with respect to a speaker area that is a source of the speaker's voice from among frame images constituting a moving image that is input through the moving image input unit. The image signal processing may be auto out-of-focusing or macro zooming with respect to the speaker area, or macro focusing in which auto focusing and zooming are simultaneously performed.

Although not shown in FIG. 3, when it is determined that the voice recognizing unit 31b-1 recognizes a voice, the image signal processing unit/CPU 31b may further include a face recognizing unit for specifying the speaker area using a face recognition algorithm.

The image signal processing unit/CPU 31b includes a mouth shape recognizing unit 31b-3 for recognizing the shape of a speaker's mouth with respect to the speaker area in which image signal processing, such as auto out-of-focusing, zooming, or macro focusing, is performed. When the shape of the speaker's mouth with respect to the speaker area is changed, the image signal processing unit/CPU 31b includes a still image generating unit 31b-4 for generating a still image including the speaker area. The image signal processing unit/ CPU 31b may include a moving image file generating unit 31b-5 for generating a moving image file including the still image and a moving image. The still image generating unit 31b-4 may generate still images each including a speaker area when another speaker area in which the shape of a speaker's mouth is changed is detected with respect to frame images constituting a moving image. The generated still images may function as a bookmark of the input moving image. Accordingly, the moving image file generating unit 31b-5 may generate a moving image file including the input moving image and the plurality of still images functioning as a bookmark.

Figure 4:
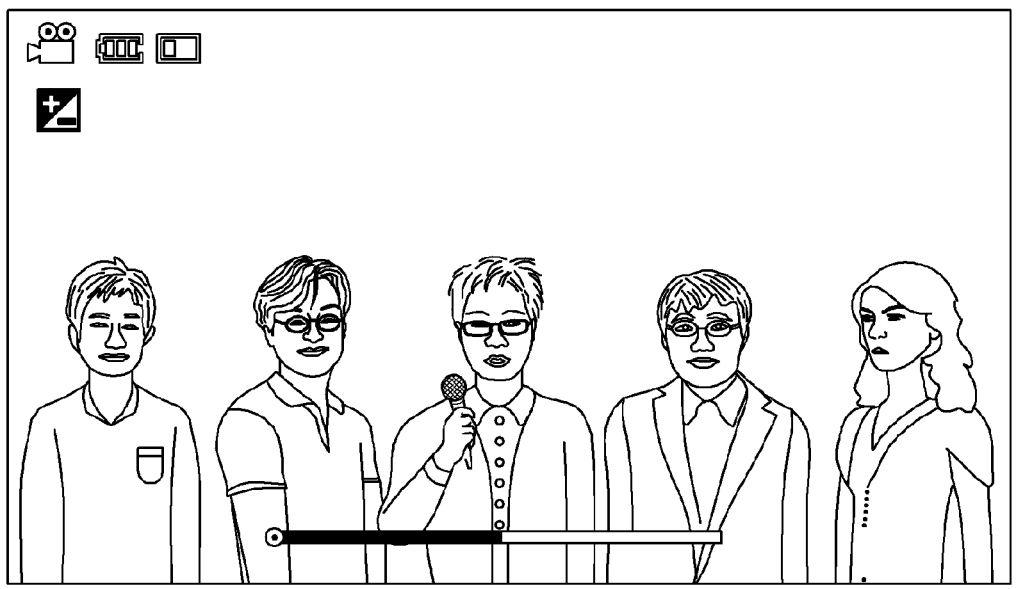
FIG. 4 is a view for explaining a screen displaying a moving image photographed using the digital camera of FIG. 1.

FIG. 4 is a view for explaining a screen displaying a moving image photographed using the digital camera of FIG. 1. Referring to FIG. 4, a moving image is photographed using the digital camera of FIG. 1 with respect to a plurality of speakers holding a microphone by turns. When change in the shape of a mouth of a speaker in the center of the screen is recognized, a speaker area including the shape of the speaker's mouth may be captured as a still image. The still image may be generated by selectively capturing only the speaker area or capturing a frame image at a point of time when the shape of the speaker's mouth is changed.

Figure 5:
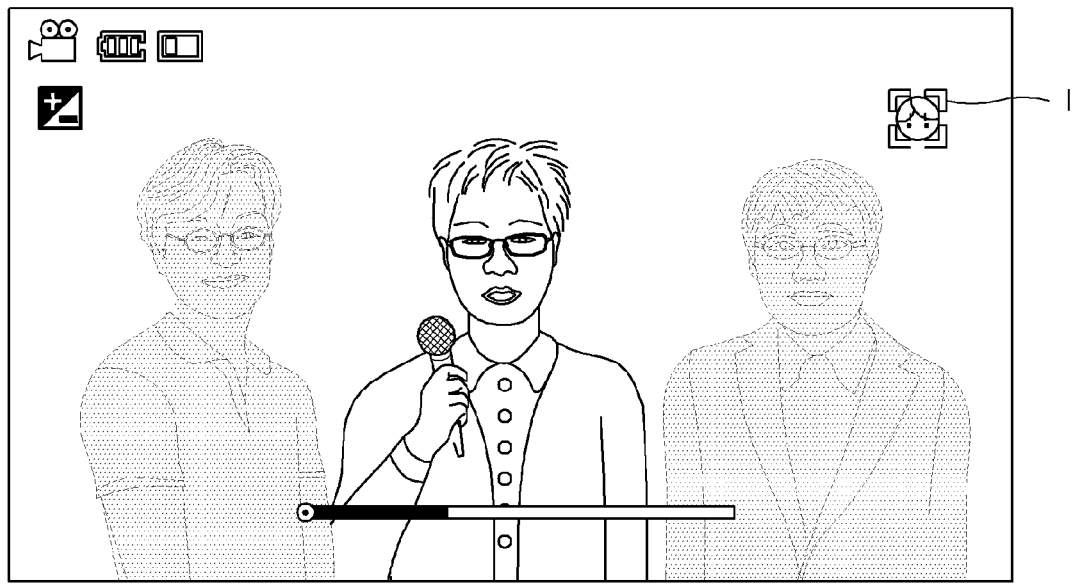
FIG. 5 is a view for explaining an operation for recognizing a speaker and performing an auto out-of-focusing process with respect to a speaker area when a moving image is photographed using the digital camera of FIG. 1.

If the speaker in the middle of the screen holds a microphone and speaks, the speaker's voice is recognized, and out-of-focusing is automatically performed with respect to a speaker area including at least a part of a source of the speaker's voice, thereby generating frame images in which the speaker area is clear and a peripheral area other than the speaker area is blurry. At this time, a face area may be detected using a face recognition algorithm, and an icon I representing detection of the face area may be displayed. These operations are as illustrated in FIG. 5.

Figure 6:
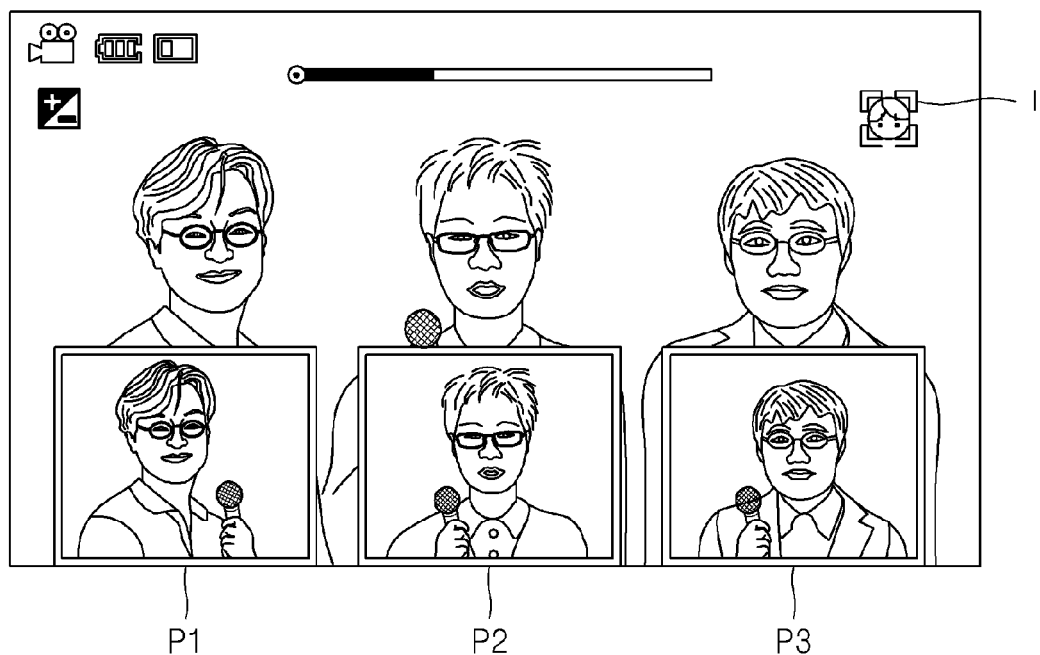
FIG. 6 is a view for explaining a bookmark function according to a speaker of the generated moving image, according to an embodiment of the invention.

FIG. 6 is a view for explaining a bookmark function according to a speaker of a generated moving image, according to an embodiment of the invention. Referring to FIG. 6, when photographing of a moving image is finished and thus a moving image file is generated, the moving image file may include still images generated for each speaker, as described in FIG. 4, so as to function as a bookmark according to a speaker. In the current embodiment, when a P1 speaker, a P2 speaker, and a P3 speaker sequentially speak, a still image is generated by capturing a frame image at a point of time when each speaker speaks, for example, when each speaker starts to speak. Accordingly, three still images may be generated, and a moving image file including the three still images and the photographed moving image may be generated.

When the moving image file is reproduced, the still images may function as a bookmark. If a still image of the P1 speaker is selected, a moving image displaying the P1 speaker who is speaking is reproduced. If a still image of the P2 speaker is selected, a moving image displaying the P2 speaker who is speaking is reproduced. Accordingly, a point of time when a moving image file is reproduced may be arbitrarily controlled for each speaker.

Hereinafter, a moving image photographing method according to the invention will be described.

Figure 7:
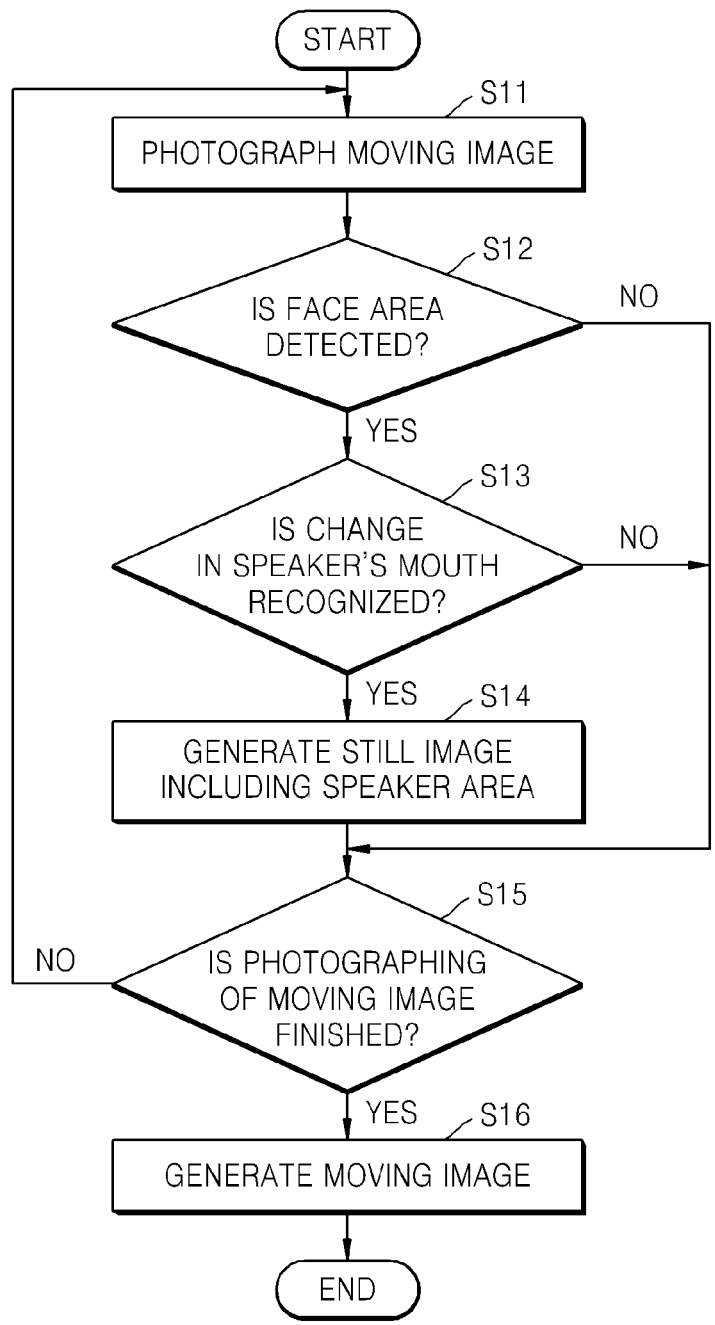
FIG. 7 is a flowchart for explaining a moving image photographing method, according to an embodiment of the invention.

FIG. 7 is a flowchart for explaining a moving image photographing method, according to an embodiment of the invention.

Referring to FIG. 7, photographing of a moving image begins (S11). A face area is detected with respect to frame images constituting the moving image using a face recognition algorithm (S12). It is determined whether the shape of a speaker's mouth is changed by recognizing the shape of the speaker's mouth with respect to the detected face area (S13). In the current embodiment, the shape of the speaker's mouth is recognized with respect to the detected face area, but the process for recognizing the face may be omitted, and the shape of the speaker's mouth may be recognized only with respect to the frame image. When the shape of the speaker's mouth is changed, a still image including a speaker area including a mouth area is generated (S14). When the face area is detected, the face area in which the shape of the speaker's mouth is changed may correspond to the speaker area, and thus a still image including the face area may be generated. Then, it is determined whether the photographing of the moving image is finished (S15). If the photographing of the moving image is finished, a moving image file including the input moving image and the still image is generated (S16).

If the face area is not detected in S12 or if change in the shape of the speaker's mouth is not recognized in S13, the method proceeds to S15 to determine whether the photographing of the moving image is finished. When the photographing of the moving image is finished, the moving image file including the input moving image is generated (S16).

If the photographing of the moving image is not finished in S15, the photographing of the moving image continues until the photographing of the moving image is finished (S11). For example, a user may press a shutter release button to start photographing of a moving image, and may press the shutter release button again to finish the photographing of the moving image. Alternatively, the user may touch a touch screen to start or finish the photographing of the moving image.

Figure 8:
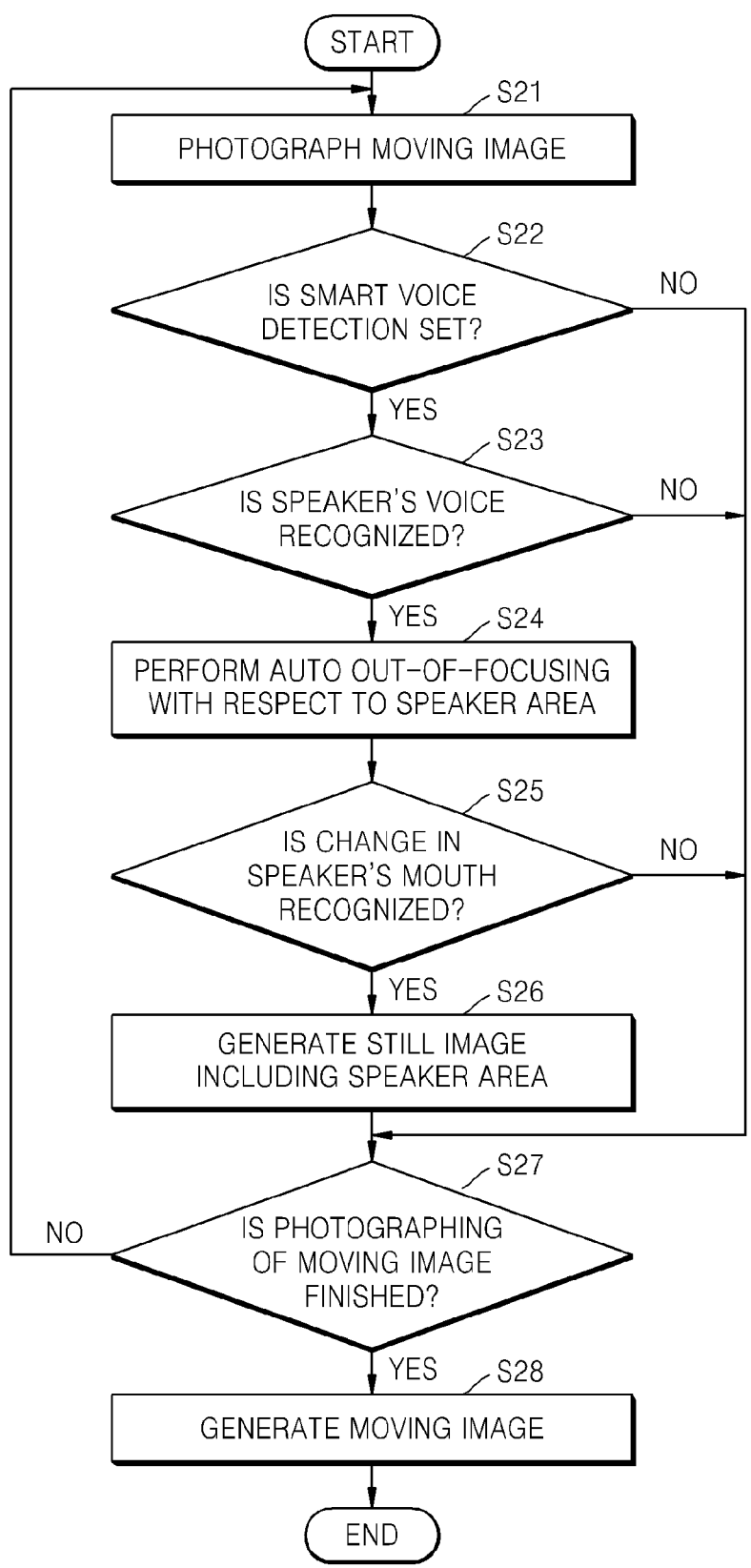
FIG. 8 is a flowchart for explaining a moving image photographing method, according to another embodiment of the invention.

FIG. 8 is a flowchart for explaining a moving image photographing method, according to another embodiment of the invention.

Referring to FIG. 8, photographing of a moving image begins (S21). It is determined whether smart voice detection is set (S22). The smart voice detection may be set through a user's manipulation or automatically. When the smart voice detection is set, a speaker's voice that is input through a microphone is recognized (S23). A source of the input speaker's voice may be recognized. For example, the source of the input speaker's voice may be recognized using a beam-forming technique that is used to strengthen speaker's voice from a specific direction and to decrease noise from other directions and using an independent component analysis (ICA) that is used to divide original sound from mixed signals by a statistical algorithm. When the source of the input speaker's voice is not recognized or when a plurality of voices exist, it may be determined that the speaker's voice is not recognized. When recognition of the voice data succeeds and when there is a single voice, the speaker's voice is recognized as a main voice. When recognition of the speaker's voice succeeds, a position of the speaker's voice may be determined as a standard subject to derive a speaker area. Auto out-of-focusing may be performed with respect to the derived speaker area (S24). In the current embodiment, the auto out-of-focusing is performed with respect to the speaker area, but the invention is not limited thereto. That is, image signal processing such as zooming or macro focusing may be performed with respect to the speaker area.

It is determined whether the shape of a speaker's mouth is changed by periodically recognizing the shape of the speaker's mouth with respect to the speaker area (S25). When the shape of the speaker's mouth is changed, a still image including the speaker area is generated (S26).

Then, it is determined whether photographing of a moving image is finished (S27). When the photographing of the moving image is finished, a moving image file including the still image and the input moving image is generated (S28). Accordingly, when the moving image file is reproduced, the still image may function as a bookmark, thereby selectively reproducing an image according to a speaker. When the photographing of the moving image is not finished, the photographing of the moving image is continuously performed (S21).

In S22, when smart voice detection is not set, when speaker's voice is not recognized in S23, and when the shape of a speaker's mouth with respect to a speaker area is not recognized in S25, a general moving image photographing mode is performed. When the photographing of the moving image is finished, the moving image file including the input moving image is generated (S28).

According to the invention, a moving image may be selectively reproduced for each speaker by recognizing and detecting movement of a sound source, for example, a speaker area, selectively performing image signal processing with respect to the detected speaker area, generating a still image including the speaker area, and using the generated still image as a bookmark of the moving image.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A moving image photographing method comprising:
    inputting a moving image photographed using a speaker as a subject;
    recognizing the shape of the speaker's mouth;
    capturing an image of the speaker at a point in time when the speaker speaks;
    generating a still image comprising a speaker area when the shape of the speaker's mouth is changed; and
    generating a moving image file containing the still image functioning as a bookmark of the moving image;
    wherein the still image functions as a bookmark selectable to reproduce the moving image at the point in time when the speaker speaks.

2. The moving image photographing method of claim 1, further comprising
    identifying the speaker area using a face recognition algorithm,
    wherein the shape of the speaker's mouth is recognized with respect to the speaker area.

3. The moving image photographing method of claim 1, further comprising:
    inputting the speaker's voice;
    recognizing the speaker's voice; and
    when the speaker's voice is recognized, performing image signal processing with respect to the speaker area.

4. The moving image photographing method of claim 3, wherein the recognizing of the speaker's voice comprises:
    comparing stored voice data with the speaker's voice data; and
    when the speaker's voice data corresponds to the stored voice data, determining that the speaker's voice is recognized.

5. The moving image photographing method of claim 3, wherein the performing of image signal processing with respect to the speaker area comprises performing auto out-of-focusing with respect to the speaker area,
    wherein the still image comprises the speaker area in which the auto out-of-focusing is performed.

6. The moving image photographing method of claim 1, wherein the performing of image signal processing with respect to the speaker area comprises performing macro zooming with respect to the speaker area, wherein the still image comprises the speaker area in which the macro zooming is performed.

7. The moving image photographing method of claim 1, wherein the performing of image signal processing with respect to the speaker area comprises performing macro focusing with respect to the speaker area,
wherein the still image comprises the speaker area in which the macro focusing is performed.

8. The moving image photographing method of claim 1, further comprising generating still images each comprising a speaker area when the speaker area is changed.

9. The moving image photographing method of claim 1, further comprising:
receiving a selection of the bookmark; and
based on the selected bookmark, reproducing the moving image at the point of time when the speaker speaks.

10. The moving image photographing method of claim 1, wherein
inputting a moving image comprises inputting a moving image photographed using a plurality of speakers as subjects;
recognizing the shape of the speaker's mouth comprises recognizing the shape of each of the plurality of speakers' mouths;
capturing an image of the speaker comprises capturing an image of each of the plurality of speakers at respective points in time when each speaker speaks;
generating a still image comprises generating a plurality of still images, each still image of the plurality corresponding to the captured image of a speaker of the plurality of speakers;
each still image comprises a speaker area when the shape of a speakers mouth changes, and functions as a bookmark selectable to reproduce the moving image at the respective point in time at which the speaker's mouth changes.

11. A moving image photographing apparatus comprising:
a moving image input unit for inputting a moving image photographed using a speaker as a subject;
a mouth shape recognizing unit for recognizing the shape of the speaker's mouth;
an image capture device for capturing an image of the speaker at a point in time when the speaker speaks;
a still image generating unit for generating a still image comprising a speaker area when the shape of the speaker's mouth is changed; and
a moving image generator unit for generating a moving image file containing the still image functioning as a bookmark of the moving image,
wherein the still image functions as a bookmark selectable to reproduce the moving image at the point in time when the speaker speaks.

12. The moving image photographing apparatus of claim 11, further comprising a face recognizing unit for specifying the speaker area using a face recognition algorithm,
wherein the mouth shape recognizing unit recognizes the shape of the speaker's mouth with respect to the speaker area.

13. The moving image photographing apparatus of claim 11, further comprising:
a voice input unit for inputting the speaker's voice;
a voice recognizing unit for recognizing the speaker's voice; and
when the speaker's voice is recognized, an image signal processing unit for performing image signal processing with respect to the speaker area.

14. The moving image photographing apparatus of claim 13, wherein the voice recognizing unit comprises:
a comparing unit for comparing stored voice data with the speaker's voice data; and
when the speaker's voice data corresponds to the stored voice data, a determining unit for determining that the speaker's voice is recognized.

15. The moving image photographing apparatus of claim 13, wherein the image signal processing unit performs auto out-of-focusing with respect to the speaker area, and the still image generating unit generates a still image comprising the speaker area in which the auto out-of-focusing is performed.

16. The moving image photographing apparatus of claim 13, wherein the image signal processing unit performs macro zooming with respect to the speaker area, and the still image generating unit generates a still image comprising the speaker area in which the macro zooming is performed.

17. The moving image photographing apparatus of claim 13, wherein the image signal processing unit performs macro focusing with respect to the speaker area, and the still image generating unit generates a still image comprising the speaker area in which the macro focusing is performed.

18. The moving image photographing apparatus of claim 11, wherein the still image generating unit generates still images each comprising a speaker area when the speaker area is changed.

19. The moving image photographing apparatus of claim 11, further comprising: a manipulation unit for receiving a selection of the bookmark.

20. A non-transitory computer-readable medium storing instructions that, when executed, cause the computer to perform steps comprising:
inputting a moving image photographed using a speaker as a subject;
recognizing the shape of the speaker's mouth;
capturing an image of the speaker at a point in time when the speaker speaks;
generating a still image comprising a speaker area when the shape of the speaker's mouth is changed; and
generating a moving image file containing the still image functioning as a bookmark of the moving image;
wherein the still image functions as a bookmark that is selectable for reproducing the moving image at the point in time when the speaker speaks.

21. The non-transitory computer-readable medium of claim 20, wherein the instructions, when executed, cause the computer to perform steps comprising:
generating still images each comprising a speaker area when the speaker area is changed; and
generating a moving image file comprising the still images functioning as bookmarks for the moving image.

* * * * *